(12) United States Patent
Pitonyak et al.

(10) Patent No.: US 8,905,429 B1
(45) Date of Patent: Dec. 9, 2014

(54) PROTECTIVE CUSHION

(71) Applicants: Andrew J. Pitonyak, Auburn Hills, MI (US); Dale E. Tauchen, Clinton Township, MI (US); Pongdet P. Wipasuramonton, Rochester, MI (US)

(72) Inventors: Andrew J. Pitonyak, Auburn Hills, MI (US); Dale E. Tauchen, Clinton Township, MI (US); Pongdet P. Wipasuramonton, Rochester, MI (US)

(73) Assignee: TK Holdings Inc., Armada, MI (US)

( * ) Notice: Subject to any disclaimer, the term of this patent is extended or adjusted under 35 U.S.C. 154(b) by 0 days.

(21) Appl. No.: 13/665,189

(22) Filed: Oct. 31, 2012

Related U.S. Application Data

(60) Provisional application No. 61/553,894, filed on Oct. 31, 2011.

(51) Int. Cl.
*B60R 21/16* (2006.01)

(52) U.S. Cl.
USPC .................................................... 280/728.1

(58) Field of Classification Search
USPC .................................... 280/728.1, 743.1, 736
See application file for complete search history.

(56) References Cited

U.S. PATENT DOCUMENTS

| | | | | |
|---|---|---|---|---|
| 6,659,499 | B2* | 12/2003 | Jenkins | 280/735 |
| 6,932,380 | B2* | 8/2005 | Choi | 280/730.1 |
| 8,353,530 | B2* | 1/2013 | Czach et al. | 280/730.2 |

* cited by examiner

*Primary Examiner* — Faye M. Fleming
(74) *Attorney, Agent, or Firm* — L.C. Begin & Associates, PLLC.

(57) ABSTRACT

An inflatable device includes a protective patch attached to an interior surface of the device to cover a portion of the surface, wherein the patch is not positioned over an opening in the device.

8 Claims, 4 Drawing Sheets

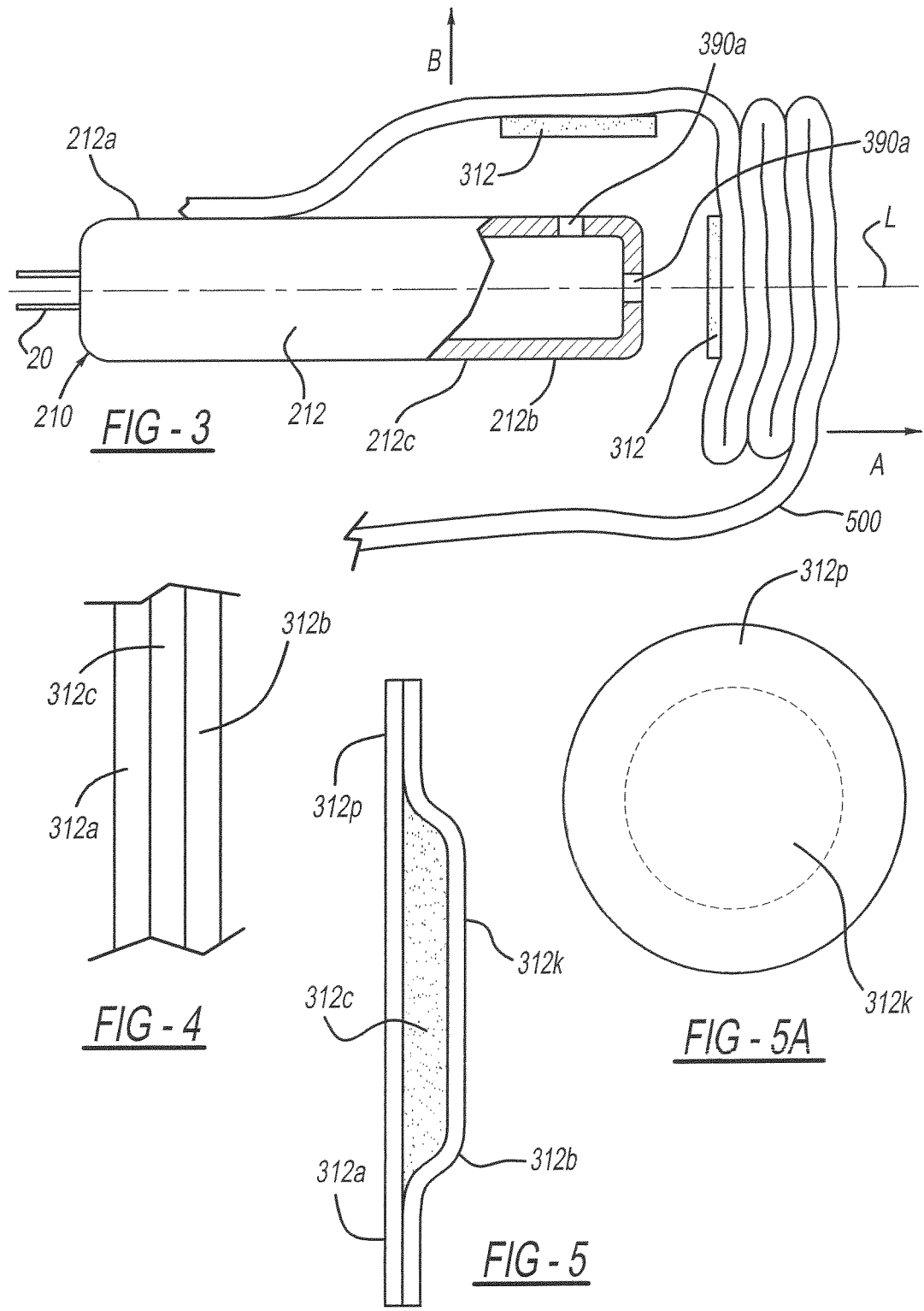

PROTECTIVE CUSHION

CROSS-REFERENCE TO RELATED APPLICATIONS

This application claims the benefit of U.S. Provisional Application Ser. No. 61/553,894 filed on Oct. 31, 2011.

TECHNICAL FIELD

The present invention relates generally to vehicle occupant protection systems and, more particularly, to cushions or airbags used in vehicle occupant protection systems.

BACKGROUND OF THE INVENTION

Conventional inflatable protective devices (such as airbags or protective inflatable cushions) are oftentimes formed from a plurality of fabric panels sewn together to form the cushion. A throat or gas passage may be formed in the airbag for passage of inflation gas therethrough, from an associated inflator (for example, a gas generating system). The airbag/cushion may also be secured to the inflator along the throat to provide a gas-tight seal between the airbag/cushion and the inflator. The throat or gas passage may be defined by edges or other portions of the panels as the panels are sewn together.

The interior surfaces of the airbag or cushion may be coated with silicone to help protect against heat damage from hot gases and other by-products resulting from combustion of gas generant materials in the associated inflator. Although effective, the application of the protective silicone layer to the entire interior surface of the airbag or cushion is expensive. Furthermore, the weight and packaging size of the airbag or cushion is increased due to the weight of the inner silicone layer.

Inflators may also incorporate a metallic diffuser positioned so as to be in fluid communication with the gases exiting from the gas generator. Also, a metallic filter may be employed within the gas generator to function not only as a filter, but also as a heat sink. This may or may not be used in conjunction with the silicone coating on the airbag inner wall. By diffusing the gases, the impact of heat and other gas generant by-products such as hot gas and solids, for example, is distributed about the inner wall of the airbag. As such, the risk of damage to the airbag cushion because of a concentrated flow of heat, hot solids, and hot gases during actuation of the vehicle occupant protection system, is mitigated or eliminated. However, diffusers and filters add weight, complexity and cost to the inflator design.

Thus, it is desirable to minimize the weight and packaging size of the airbag, while still accommodating the protective concerns relative to the hot gas generating products as defined above. It is also desirable to simplify the design and reduce the cost of an associated inflator by eliminating the need for metallic diffusers and metallic filters, while still addressing the concerns described above.

SUMMARY OF THE INVENTION

In one aspect of the embodiments of the present invention, an inflatable device is provided including a protective patch attached to an interior surface of the device to cover a portion of the surface, wherein the patch is not positioned over an opening in the device.

In another aspect of the embodiments of the present invention, an airbag module is provided comprising an inflator and an airbag operatively coupled to the inflator so as to enable fluid communication between the inflator and the airbag after activation of the inflator. The airbag includes at least one protective patch attached to an interior surface of the airbag at a location residing directly opposite an associated gas exit orifice of the inflator.

BRIEF DESCRIPTION OF THE DRAWINGS

FIGS. 1-3 show partial cross-sectional views of a portions of airbag/cushion modules, each including an inflator and an airbag/cushion incorporating at least one patch in accordance with an embodiment of the present invention.

FIG. 4 is a cross-sectional view of a portion of a patch in accordance with one embodiment of the present invention.

FIG. 5A is a plan view of a patch in accordance with another embodiment of the present invention.

FIG. 5 is a cross-sectional view of the embodiment shown in FIG. 5A.

DETAILED DESCRIPTION

In the embodiments described herein, similar elements in different embodiments of the present invention have been given similar elements numerals.

Figure 1:
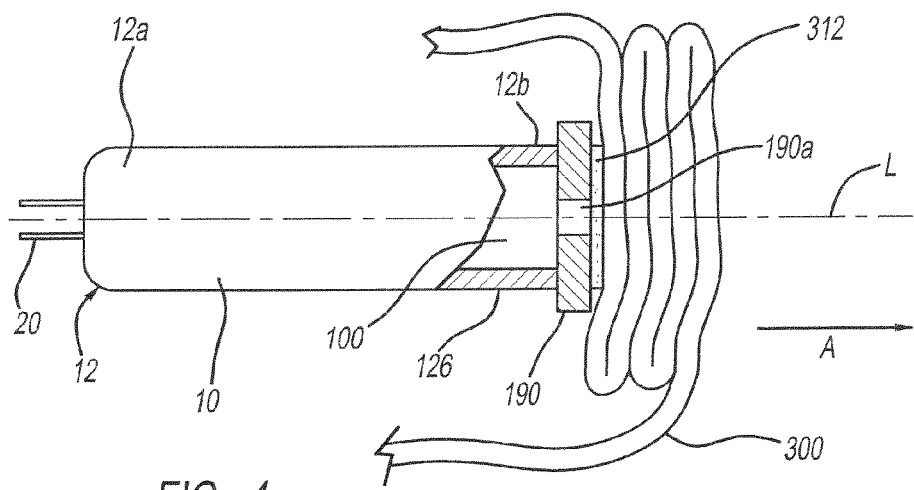
Figure 1A:
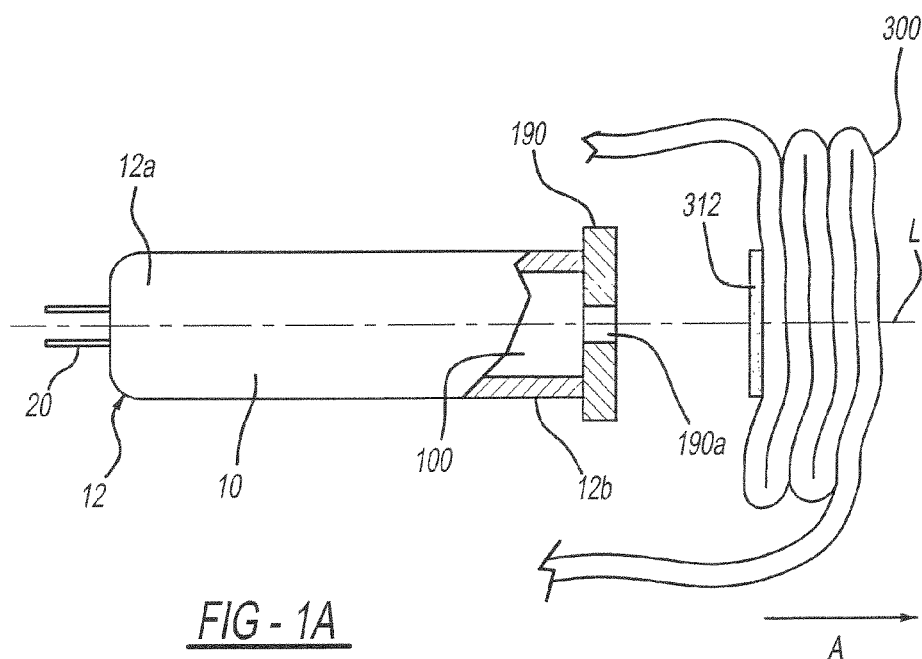

Referring to FIGS. 1 and 1A, one embodiment of an inflator 10 includes a substantially cylindrical housing 12 having a first end 12a, a second end 12b opposite the first end, and a wall 12c extending between the ends to define a housing interior cavity 100. A portion of cavity 100 defines a combustion chamber for a known combustible gas generant material (not shown). Housing 12 is made from a metal or metal alloy and may be a cast, stamped, deep-drawn, extruded, or otherwise metal-formed.

Housing first end 12a is configured for receiving a portion of a known, suitable initiator 20 therein, and is also configured to aid in retaining the initiator in place within the housing 12 once the initiator has been positioned. Housing end 12a may be structured so as to support and maintain initiator 20 in position during operation of the inflator.

A nozzle 190 is positioned and secured at housing second end 12b and contains one or more gas exit orifices 190a for enabling fluid communication between an interior of the housing and an associated inflatable device (for example, an airbag or cushion incorporated into a vehicle occupant protection system.). Nozzle 190 directs generated gases from the housing interior into the associated inflatable device. In the embodiment shown, nozzle 190 is formed separately from housing 12 and may be attached to housing second end 12b by welding, adhesive attachment, threaded engagement, or any other suitable means, depending on the materials from which the housing and nozzle are formed, the operational requirements of a particular application, and other pertinent factors. The nozzle 190 is attached to housing 12 so as to form a gas-tight seal between the nozzle and the housing. Nozzle 190 may be forged, machined, molded or otherwise formed from a metallic material, a polymer material, or any other suitable material depending on the requirements of a particular application. Orifice(s) 190a may be drilled, punched, molded into the part, or otherwise suitably formed.

Nozzle 190 may also have any of a variety of suitable configurations and may include any desired number of orifices 190a in any configuration suitable for a given application. In the embodiment shown in FIGS. 1 and 1A, nozzle 190 comprises a block of material having a single orifice 190a extending therethrough for directing generated gases in a particular direction, and a side portion 190b formed thereal-ong to provide a mounting surface to facilitate mounting of the nozzle to a portion of a vehicle, if desired. In one embodiment, the orifice 190a is configured so as to channel the generated gases out of the housing along, or in a direction parallel to, a longitudinal axis L of the housing 12 (i.e., in the direction indicated by arrow A).

In another embodiment (shown in FIGS. 2 and 2A), the end nozzle or the housing second end 112b is formed into a hollow, tubular configuration and includes one or more gas it orifices 290a arranged so as to direct the generated gases in a direction (or directions) perpendicular to a longitudinal axis L of the housing 112 (for example, in the direction indicated by arrow B) as the gases exit the gas generating system.

In yet another embodiment (shown in FIG. 3), the end nozzle or the housing second end 212b is formed into a hollow, tubular configuration and includes multiple gas exit orifices 390a arranged so as to direct the generated gases in multiple directions (for example, in the directions indicated by arrows A and B, in directions both perpendicular to and parallel with axis L) as the gases exit the gas generating system. However, the positioning of the patch or patches attached to the airbag/cushion in accordance with the embodiments of the present invention may be adjusted to accommodate one or more gas streams emanating from the inflator in any direction or directions, according to the requirements of a particular application.

In a particular embodiment (not shown), a single patch may be cut or configured so as to cover portions of the airbag/cushion positioned covering or directly opposite multiple gas exit orifices.

Any of inflators 10, 110, 210 may be incorporated into a vehicle occupant safety module or airbag module. The module may include an associated airbag or safety cushion 300, 400, 500, respectively, in fluid communication with the associated inflator. FIGS. 1-5 show various embodiments of folded cushions 300, 400, and 500, each cushion attached to an associated one of inflators 10, 110, and 210. The inflator may be connected via one, two or more wires to a controller (not shown). The controller may detect the occurrence of a crash event (through one or more detectors), determine whether the airbag or cushion should be deployed, and send an activation signal or command to the inflator, which results in inflation and deployment of the airbag/cushion.

The airbag/cushion 300/400/500 may comprise inflatable portions that are bordered by internal seams (not shown) and one or more external seams (not shown) that define the outer periphery of the airbag. The seams may take any desirable shape. The airbag/cushion 300/400/500 may be used to protect one or more occupants from impacting the side walls and windows of the vehicle or to prevent the occupant from being thrown out of the vehicle. The vehicle in which the airbag and occupant safety module is installed may be a car, a plane, a train, or any other type of transportation. The airbag/cushion may take any suitable form such as a curtain airbag/cushion, a driver side airbag/cushion, a passenger side airbag/cushion or the like.

As used herein, the term "non-siliconized" as applied to an airbag or cushion 300/400/500 is understood to mean that interior surfaces of the airbag or cushion which are covered by the patch do not have a layer of silicone applied thereto.

Referring to FIGS. 1-5, in the embodiments of the present invention, a thermal shield or insulator in the form of a patch 312 is sewn or otherwise attached (such as adhesively) to one or more predetermined areas of the airbag/cushion interior surface. This patch is distinguished from coverings positioned over openings formed in the airbag for venting purposes, for example, to seal the openings until an airbag internal pressure within a predetermined range has been reached. Thus, a patch 312 in accordance with the embodiments of the present invention remains attached to the airbag/cushion interior and also within the interior of the airbag/cushion throughout the inflation period.

FIG. 4 is a cross sectional view of a portion of a protective patch 312 in accordance with one embodiment of the present invention. In the embodiment shown in FIG. 4, the patch 312 is made by forming a first panel 312a and a second panel 312b. Panels 312a and 312b may be formed from any material suitable for the purposes described herein. The first and second panels 312a and 312b may be the same material or different materials. For example, the first and second layers may be made from Nylon weave (such as Nylon-6,6 (PA66)), a polyester weave, or the like. In one embodiment, one or both of the panels are formed from Nylon (such as Nylon-6,6, for example). However, one or more of the panels may be formed from any other suitable material, for example, a polyester weave, or the like.

In a particular embodiment, one or more of the panels 312a and 312b are coated (in a known manner) on at least one side with a layer of silicone (for example, a silicone elastomer coating (not shown)) prior to assembly of the patch. The coatings applied to the first and second panels may be the same type of coating or different types of coating. For example, either of the coatings may comprise a synthetic rubber, such as liquid silicone rubber, because of its high heat resistance and high non-flammability. In addition, the coatings do not necessarily have to be applied to both sides of the panels. For example, the coatings may only be provided on the sides of the panels that will face each other when the panel is assembled. In other embodiments, a non-siliconized material is used for one or more of the panels.

In fabricating the patch, a desired amount of a suitable thermally-insulating bonding material 312c (for example, as a silicone adhesive) is deposited on a surface of a first one of the panels 312a, 312b. In one embodiment, the silicone adhesive is SE6750 Two-Part Silicone, manufactured by Dow Corning® Toray Co., Ltd. However, any similar or otherwise suitable silicone material may be used, provided that the material meets the thermal protection requirements of a particular application and may be processed in the manner described herein to fabricate the patch.

If siliconized or coated panels are used, then the thermally-insulating bonding material is applied to a coated side of the patch material. A second one of the panels 312a, 312b is then placed in contact with the bonding material 312c so as to overlay the first one of the panels 312a, 312b to form a sub-assembly of patching material. If siliconized or coated panels are used, then the coated side of the patch material is placed in contact with the bonding material. Although the embodiment shown utilizes a silicone-based bonding material, alternative materials may be used if suitable for the applications described herein.

Pressure is then applied to the sub-assembly (by, for example, positioning the sub-assembly between two platens or other pressing means) to form a patch having a thickness within a predetermined range. To provide a patch having the desired thickness, a suitable spacing is maintained between the platens by using shims or other suitable hard stops and accounting for resilient "springback" (if any) of the patch materials after release of the pressure. Heat is also applied to the pressed sub-assembly to cure the bonding material. Application of heat and pressure are according to the requirements of the particular bonding material. The heat-cured silicone bonding material 312c forms a bond between the first and second panels 312a and 312b. In an embodiment using non-siliconized material for one or more of the panels, the applied pressure may be controlled so as to prevent flow or seepage of the silicon bonding material through the fibers of the panel material.

In a particular embodiment, the finished patch (or sheet of patch material) has a maximum thickness in the range of 0.5 mm to 2.0 mm. However, the overall or total patch thickness can be tailored to any of a range of values depending on the thermal protection requirements of a particular application. Thus, a thicker patch can be provided for applications where the portion of the cushion/airbag material covered by the patch is expected to experience a relatively higher thermal loading due to impingement thereon of relatively higher-temperature gases and combustion by-products. For example, a relatively thicker patch may be provided where the patch is in direct contact with the inflator proximate the gas exit orifice, or where the spacing between the gas exit orifice and the airbag/cushion is relatively small. Factors affecting the thicknesses of the panels 312a and 312b and the thickness of the layer of bonding material applied between the panels may be affected by such factors as the distance(s) of the patch covered portion(s) of the airbag/cushion from the gas exit orifices of the gas generating system, the temperature and velocity of the combustion products exiting the gas generating system, the material(s) from which the airbag/cushion are formed, the desired total thickness of the patch when fabrication is complete, and other pertinent factors.

The bonding material selected should provide a bond between the panels 312a and 312b (whether the panels materials are coated or uncoated) of sufficient strength and heat resistance to resist delamination or disassembly of the patch (i.e., detachment of the panels 312a and 312b from one another) during impingement of gases and other combustion by-products on the panel during inflation of the inflatable device.

Referring to FIGS. 5 and 5A, in a particular embodiment, outer edges of the panels 312a and 312b are structured to, when directly attached to each other, provide an outer edge 312p of the patch which circumscribes or encloses a region or pocket 312k of the patch containing the bonding material 312c and the portions of the panels sandwiching the bonding material. These opposed outer edges of the panels may be bonded, glued, stitched, or otherwise attached to each other to provide an outer edge of the patch which is relatively thinner than the portion of the patch enclosing the binding material 312c. In this embodiment, the surface area and thickness of the central patch region containing the thermally-insulating bonding material may be sized to provide the required thermal insulation of the covered portion of the airbag/cushion, while the relatively thinner outer edge portion of the patch facilitates attachment of the patch (for example, by stitching) to the airbag/cushion along the patch outer edge.

In one embodiment, the patch is formed by cutting panels 312a and 312b to a desired size and shape, and then attaching the panels to each other as previously described. In another embodiment, a bulk sheet of patch material may be formed in a manner previously described and then individual, separate pieces cut therefrom to create one or more patches suitable for attachment to the airbag/cushion interior surfaces.

The patch is attached to an interior surface of the airbag/cushion so as to ensure that the patch will remain attached to and covering the covered portion of the airbag/cushion at least during the period over which combustion products flow from the gas generating system and into the airbag/cushion. Suitable attachment methods include stitching, adhesive application, and other methods.

A patch in accordance with an embodiment of the present invention is also attached to an interior surface of the inflatable device at a location projected to be the first region of contact between the inflatable device and gases and/or products of combustion exiting the inflator. Thus, the patch is positioned on and attached to the airbag/cushion so that most or all of the pressurized gases and/or combustion products exiting the inflator will impinge upon the patch before scattering and diffusing through the remainder of the airbag interior. The patch may be positioned on and attached to the airbag/cushion so that pressurized gases exiting the inflator will contact the patch before any other portion of the airbag interior. In this manner, the patch absorbs the initial expulsion of gases and/or combustion products so that the gases and/or combustion products do not impinge upon the airbag/cushion itself as soon they leave the inflator.

Figure 2:
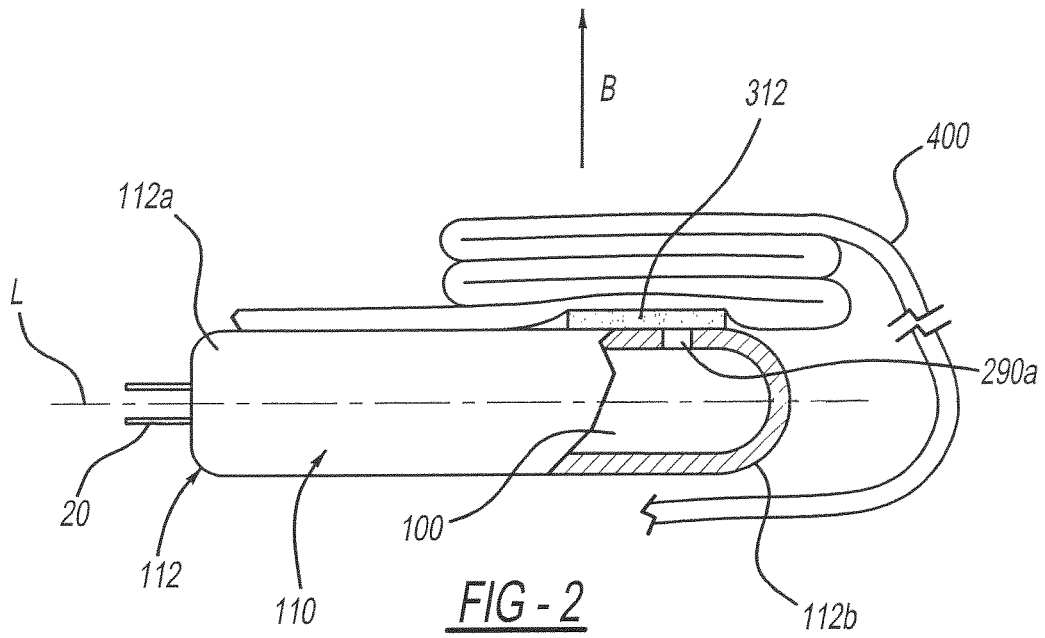

FIGS. 1-3 show airbags/cushions in fluid communication with associated inflators, each airbag/cushion including at least one patch in accordance with an embodiment of the present invention.

In the embodiments shown in FIGS. 1 and 2, portions of the associated airbags/cushions 300 and 400 are in contact with their respective inflators 10, 110 prior to activation of the inflators. In each embodiment, a patch 312 is attached to the airbag/cushion in a position designed to cover an associated gas exit orifice (190a in FIG. 1 and 290a in FIG. 2). In this position, patch 312 will receive the initial outflow of pressurized gases and generated combustion products emanating from the associated gas exit orifice Thus, the portion of the airbag/cushion covered by the patch 312 will be at least partially thermally-shielded or insulated from the gas flow, to aid in preventing or mitigating thermal damage to the non-siliconized airbag/cushion.

Figure 2A:
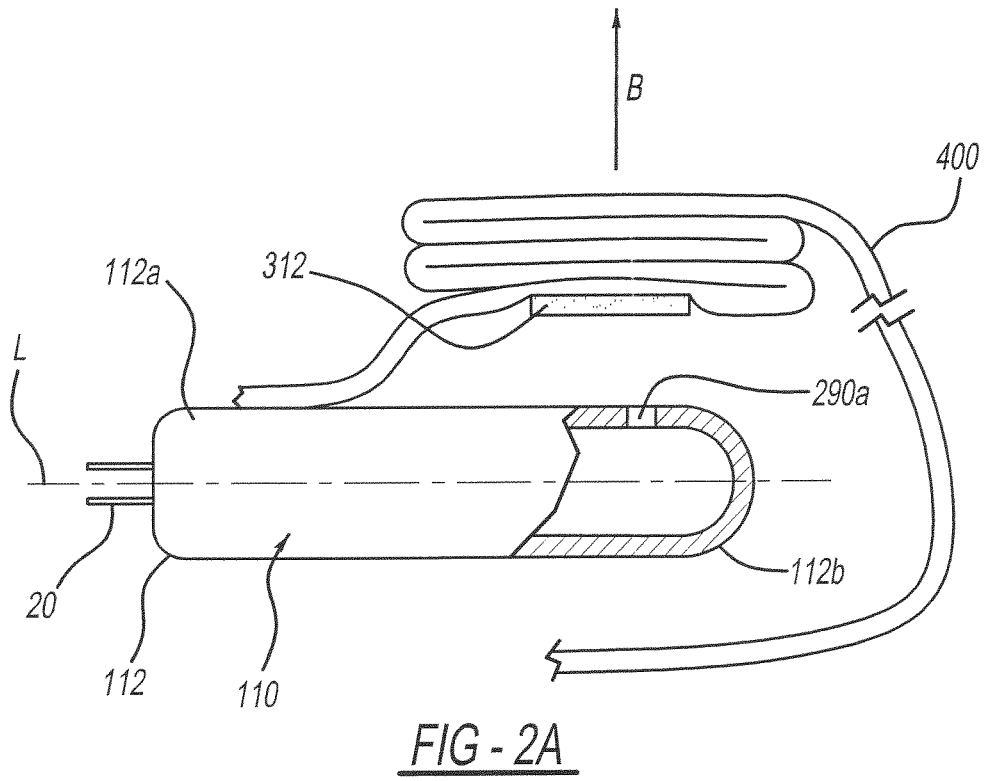

In the embodiments shown in FIGS. 1A and 2A, the associated airbag/cushion 300/400 is spaced apart from the respective inflator 10/110 prior to activation of the inflator. In each embodiment, patch 312 is attached to the airbag/cushion in a position directly opposite the associated gas exit orifice (again, 190a in FIG. 1A and 290a in FIG. 2A), to cover the portion of the airbag/cushion upon which gasses exiting the orifice will first impinge. In this position, patch 312 will receive the initial outflow of pressurized gases and generated combustion products emanating from associated orifices, as represented by the arrows "G". Thus, the portion of the airbag/cushion covered by the patch will be at least partially thermally-shielded from the gas flow, to aid in preventing or mitigating thermal damage to the non-siliconized airbag/cushion.

In the embodiment shown in FIG. 3, the airbag/cushion 500 is spaced apart from the inflator 210 prior to activation of the inflator. In this embodiment, patches 312 are attached to the airbag/cushion in a positions directly opposite each of multiple gas exit orifices 390a, to cover the portions of the airbag/cushion upon which gasses exiting the orifices will first impinge. In these positions, patches 312 will receive the initial outflows of pressurized gases and generated combustion products emanating from orifices 390a. Thus, the portions of the airbag/cushion 500 covered by the patches 312 will be at least partially thermally-shielded from the gas flow, to aid in preventing or mitigating thermal damage to the non-siliconized airbag/cushion. The patches may also be positioned to intercept multiple flows from the inflator when the airbag/cushion is in contact with the inflator, as shown in FIGS. 1 and 2.

The above examples illustrate how one or more patches 312 can be positioned and attached to various portions of the inner surfaces of the airbag/cushion, to intercept the gas flow from the inflator and provide thermal shielding for the covered portions of the airbag/cushion.

Positioning and attachment of one or more patches in accordance with embodiments of the present invention obviates the need to coat the interior surfaces of the airbag/cushion to help protect the airbag/cushion against damage from exposure to hot gases and other gas generant combustion by-products.

Figure 6:
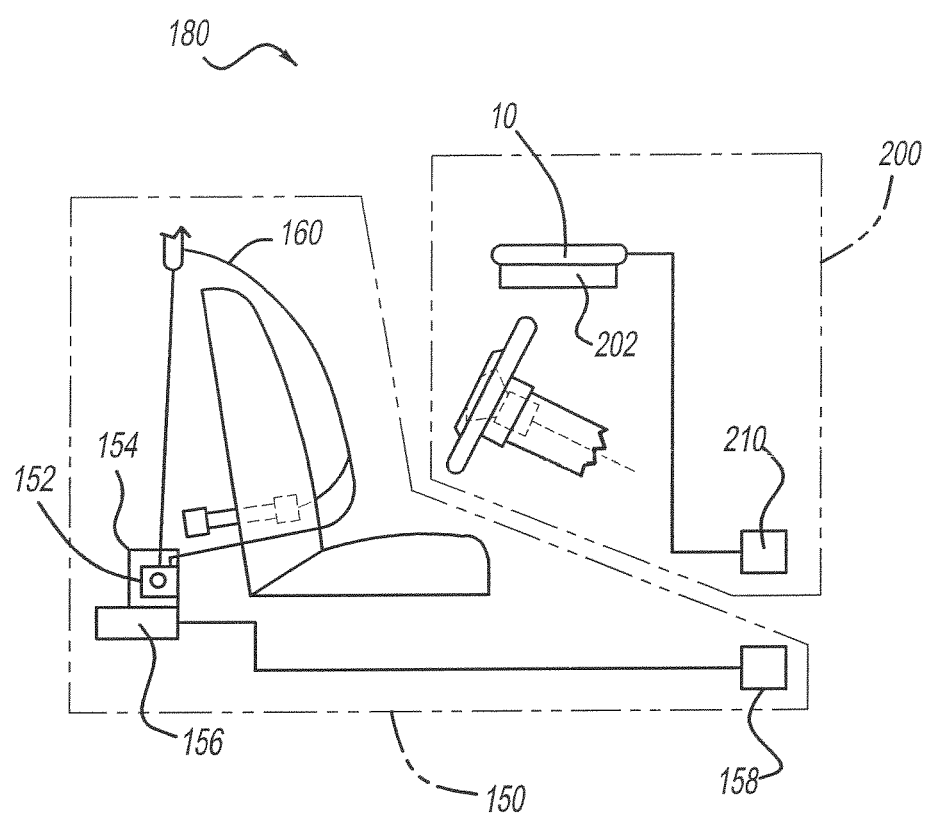
FIG. 6 is a schematic representation of an exemplary vehicle occupant protection system incorporating an airbag/cushion with one or more patches in accordance with embodiments of the present invention.

Referring now to FIG. 6, any embodiments of a patch, an airbag incorporating such a patch, or an airbag/cushion system including an airbag/cushion incorporating such a patch may be incorporated into an airbag/cushion system 200. Airbag/cushion system 200 includes at least one airbag/cushion 202 and an inflator 10 as described herein operatively coupled to the airbag/cushion 202 so as to enable inflation of the airbag/cushion by the inflator after activation of the inflator. Airbag/cushion system 200 may also be in communication with a crash event sensor 210 operating in association with a known crash sensor algorithm that signals actuation of system 200 via, for example, activation of inflator 10/110/210 in the event of a collision.

Referring again to FIG. 6, airbag/cushion system 200 may also be incorporated into a broader, more comprehensive vehicle occupant protection system 180 including additional elements such as a safety belt assembly 150. FIG. 8 shows a schematic diagram of one exemplary embodiment of such a restraint system. Safety belt assembly 150 includes a safety belt housing 152 and a safety belt 160 extending from housing 152. A safety belt retractor mechanism 154 (for example, a spring-loaded mechanism) may be coupled to an end portion of the belt. In addition, a safety belt pretensioner 156 may be coupled to belt retractor mechanism 154 to actuate the retractor mechanism in the event of a collision. Typical seat belt retractor mechanisms which may be used in conjunction with the safety belt embodiments of the present invention are described in U.S. Pat. Nos. 5,743,480, 5,553,803, 5,667,161, 5,451,008, 4,558,832 and 4,597,546, incorporated herein by reference. Illustrative examples of suitable pretensioners are described in U.S. Pat. Nos. 6,505,790 and 6,419,177, incorporated herein by reference.

Safety belt system 150 may also be in communication with a crash event sensor 158 (for example, an inertia sensor or an accelerometer) operating in association with a known crash sensor algorithm that signals actuation of belt pretensioner 156 via, for example, activation of a pyrotechnic igniter (not shown) incorporated into the pretensioner. U.S. Pat. Nos. 6,505,790 and 6,419,177, previously incorporated herein by reference, provide illustrative examples of pretensioners actuated in such a manner.

It will be understood that the foregoing description of the present invention is for illustrative purposes only, and that the various structural and operational features herein disclosed are susceptible to a number of modifications, none of which departs from the spirit and scope of the present invention. The preceding description, therefore, is not meant to limit the scope of the invention. Rather, the scope of the invention is to be determined only by the appended claims and their equivalents.

What is claimed is:

1. A protective patch for attachment to an interior of an inflatable cushion, the
   patch comprising:
   a first panel having an outer edge;
   a second panel having an outer edge; and
   a thermally-insulating bonding material secured between the first and second panels, wherein the panel outer edges are attached to each other such so as to form an outer edge of the patch which circumscribes a region containing the bonding material.

2. An airbag including a patch attached in accordance with claim 1 attached to an interior surface thereof.

3. An airbag module including an airbag in accordance with claim 2.

4. A vehicle occupant protection system including an airbag in accordance with claim 2.

5. The patch of claim 1 wherein at least one of the first and second panels is coated on at least one side thereof with a layer of silicone prior to assembly of the patch.

6. An airbag module comprising:
   an inflator; and
   an airbag operatively coupled to the inflator so as to enable fluid communication between the inflator and the airbag after activation of the inflator, the airbag including at least one protective patch attached to an interior surface of the airbag at a location residing directly opposite an associated gas exit orifice of the inflator,
   wherein the inflator includes a plurality of gas exit orifices formed therealong, and wherein a single patch is configured so as to cover portions of the airbag positioned directly opposite the gas exit orifices of the plurality of gas exit orifices.

7. An airbag module comprising:
   an inflator; and
   an airbag operatively coupled to the inflator so as to enable fluid communication between the inflator and the airbag after activation of the inflator, the airbag including at least one protective patch attached to an interior surface of the airbag at a location residing directly opposite an associated gas exit orifice of the inflator,
   wherein the module is configured such that the at least one patch is in contact with the inflator prior to activation of the inflator.

8. An airbag module comprising:
   an inflator; and
   an airbag operatively coupled to the inflator so as to enable fluid communication between the inflator and the airbag after activation of the inflator, the airbag including at least one protective patch attached to an interior surface of the airbag at a location residing directly opposite an associated gas exit orifice of the inflator,
   wherein the inflator includes a plurality of gas exit orifices formed therealong, and wherein a separate patch is configured so as to cover an associated portion of the airbag positioned directly opposite each gas exit orifice of the plurality of gas exit orifices.

* * * * *

UNITED STATES PATENT AND TRADEMARK OFFICE
CERTIFICATE OF CORRECTION

PATENT NO.         : 8,905,429 B1
APPLICATION NO.    : 13/665189
DATED              : December 9, 2014
INVENTOR(S)        : Pitonyak et al.

Page 1 of 1

It is certified that error appears in the above-identified patent and that said Letters Patent is hereby corrected as shown below:

In the Specification:

Column 3; Line 12;    delete "it" and insert --exit--.

Column 6; Line 18;    insert --as-- after soon.

Signed and Sealed this
Third Day of March, 2015

Michelle K. Lee
*Deputy Director of the United States Patent and Trademark Office*